US009967623B2

(12) United States Patent
Waller (10) Patent No.: US 9,967,623 B2
(45) Date of Patent: May 8, 2018

(54) APPARATUS AND METHOD FOR RECEIVING BROADCAST CONTENT FROM A BROADCAST STREAM AND AN ALTERNATE LOCATION

(71) Applicant: Samsung Electronics Co., Ltd., Gyeonggi-do (KR)

(72) Inventor: Arthur Simon Waller, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/900,101

(22) PCT Filed: Jun. 18, 2014

(86) PCT No.: PCT/KR2014/005337
§ 371 (c)(1),
(2) Date: Dec. 18, 2015

(87) PCT Pub. No.: WO2014/204192
PCT Pub. Date: Dec. 24, 2014

(65) Prior Publication Data
US 2016/0142770 A1      May 19, 2016

(30) Foreign Application Priority Data
Jun. 18, 2013 (GB) .................. 1310825.3

(51) Int. Cl.
*H04N 21/4722* (2011.01)
*H04N 21/462* (2011.01)
(Continued)

(52) U.S. Cl.
CPC ........ *H04N 21/4622* (2013.01); *H04H 20/24* (2013.01); *H04N 21/2362* (2013.01);
(Continued)

(58) Field of Classification Search
CPC combination set(s) only.
See application file for complete search history.

(56) References Cited

U.S. PATENT DOCUMENTS 8,839,302 B2      9/2014  Waller
9,110,101 B2 *    8/2015  Pietrowicz ............... G01R 1/20
(Continued)

FOREIGN PATENT DOCUMENTS

CN      102158669 A      8/2011
EP      1 969 851 A2     9/2008
(Continued)

OTHER PUBLICATIONS

International Search Report dated Sep. 22, 2014 in connection with International Application No. PCT/KR2014/005337; 7 pages.
(Continued)

*Primary Examiner* — Kieu Oanh T Bui (57) ABSTRACT

According to embodiments of the present invention, a receiver obtains service location information which defines current and next sources from which a data stream can be obtained, and a switching time at which the source of the data stream will be switched from the current source to the next source. Before the switching time, the receiver receives the data stream from the current source, and after the switching time, the receiver receives the data stream from the next source. The next source can be defined in initial service location information, or in updated service location information obtained later. An apparatus and method for providing the service location information are also disclosed. In some embodiments, a broadcast provider and/or the receiver can execute a method to compensate for an IP delay experienced by the receiver.

20 Claims, 6 Drawing Sheets

(51) Int. Cl.
*H04N 21/2362* (2011.01)
*H04N 21/262* (2011.01)
*H04N 21/2665* (2011.01)
*H04N 21/858* (2011.01)
*H04H 20/24* (2008.01)
*H04N 21/43* (2011.01)
*H04N 21/434* (2011.01)
*H04N 21/44* (2011.01)
*H04N 21/4402* (2011.01)
*H04N 21/45* (2011.01)
*H04N 21/61* (2011.01)
*H04N 21/643* (2011.01)
*H04H 60/25* (2008.01)
*H04H 60/51* (2008.01)

(52) U.S. Cl.
CPC ... *H04N 21/2665* (2013.01); *H04N 21/26241* (2013.01); *H04N 21/26283* (2013.01); *H04N 21/4302* (2013.01); *H04N 21/4345* (2013.01); *H04N 21/44004* (2013.01); *H04N 21/44029* (2013.01); *H04N 21/4524* (2013.01); *H04N 21/6125* (2013.01); *H04N 21/64322* (2013.01); *H04N 21/8586* (2013.01); *H04H 60/25* (2013.01); *H04H 60/51* (2013.01)

(56) References Cited

U.S. PATENT DOCUMENTS

| 2002/0056107 | A1 | 5/2002 | Schlack |
| 2002/0157034 | A1 | 10/2002 | Sagar |
| 2003/0093794 | A1 | 5/2003 | Thomas et al. |
| 2006/0259938 | A1* | 11/2006 | Kinoshita .......... H04N 21/4622 725/118 |
| 2012/0011545 | A1* | 1/2012 | Doets ................. H04N 7/17336 725/38 |
| 2012/0240145 | A1 | 9/2012 | Day |

FOREIGN PATENT DOCUMENTS

| EP | 2 579 623 A1 | 4/2013 |
| GB | 2494748 A | 3/2013 |
| KR | 10-2013-0049335 A | 5/2013 |
| WO | WO 01/93108 A2 | 12/2001 |
| WO | WO 2007/078739 A2 | 7/2007 |
| WO | WO 2013/012228 A2 | 1/2013 |

OTHER PUBLICATIONS

Written Opinion of the International Searching Authority dated Sep. 22, 2014 in connection with International Application No. PCT/KR2014/005337; 7 pages.

* cited by examiner

APPARATUS AND METHOD FOR RECEIVING BROADCAST CONTENT FROM A BROADCAST STREAM AND AN ALTERNATE LOCATION

CROSS-REFERENCE TO RELATED APPLICATIONS AND CLAIM OF PRIORITY

The present application claims priority under 35 U.S.C. § 365 to International Patent Application No. PCT/KR2014/005337 filed Jun. 18, 2014, entitled "APPARATUS AND METHOD FOR RECEIVING BROADCAST CONTENT FROM A BROADCAST STREAM AND AN ALTERNATE LOCATION", and, through International Patent Application No. PCT/KR2014/005337, to United Kingdom Patent Application No. 1310825.3 filed Jun. 18, 2013, each of which are incorporated herein by reference into the present disclosure as if fully set forth herein.

TECHNICAL FIELD

The present invention relates to receiving broadcast content from a broadcast stream and an alternate location, such as the Internet, and switching the source of the broadcast content between the broadcast stream and the alternate location.

BACKGROUND ART

The continual development and commercialisation of new wireless transmission technologies inevitably results in increasing competition for limited bandwidth resources, since only certain frequencies in the electromagnetic spectrum can be used. Examples of technologies to which spectrum must be allocated included mobile telecommunications networks, wireless networking systems (e.g. WLAN, Bluetooth, Zigbee etc.), global navigation satellite systems (GNSS) such as GPS, Galileo and GLONASS, and conventional terrestrial and satellite broadcasting services.

Because the availability of bandwidth in a broadcasting portion of the spectrum is limited, various methods have been developed in recent years to allow new services to be distributed over the Internet. Examples of known techniques include over-the-top (OTT) techniques such as Dynamic Adaptive Streaming over HTTP (DASH), or managed techniques such as multicast Real-time Transfer Protocol (RTP). For example, in the UK there are currently around 70 services provided using OTT. In addition, systems have been proposed in which the various components making up a service are delivered via a combination of a broadcast stream and the Internet. A receiver can receive data from both sources and merge them to present the service to the user.

However, although such methods allow new broadcast services to be provided without using additional bandwidth in the electromagnetic spectrum, they are not able to reduce the bandwidth usage of existing broadcasting services.

The invention is made in this context.

DISCLOSURE OF INVENTION

Technical Problem

An aspect of the present disclosure is to address at least the above-mentioned problems and/or disadvantages and to provide at least the advantages described below. Accordingly, an aspect of the present disclosure is to provide a method and apparatus for transmitting and receiving signals in a communication system.

Another aspect of the present invention is to provide a method and apparatus for receiving broadcast content from a broadcast stream and an alternate location, such as the Internet, and switching the source of the broadcast content between the broadcast stream and the alternate location.

Another aspect of the present invention, there is also provided a computer-readable storage medium arranged to store a computer program which, when executed, performs the method.

Solution to Problem

According to the present invention, there is provided a digital broadcasting receiver comprising: a broadcast content receiving module arranged to receive broadcast content from a multiplexed broadcast stream and an alternate location, wherein the broadcast content corresponds to a broadcast channel and comprises a data stream; and a controller arranged to obtain service location information including current source information and switching time information, the current source information identifying one of the broadcast stream and the alternate location as a current source from which the data stream can be obtained, and the switching time information identifying a time at which the source of the data stream will be switched, wherein the controller is further arranged to obtain next source information identifying the other one of the broadcast stream and the alternate location as the next source from which the data stream can be obtained, and to control the broadcast content receiving module to receive the data stream from the current source before the identified time and to receive the data stream from the next source after the identified time.

The digital broadcasting receiver can further comprise: a region identifying module arranged to identify a region in which the receiver is currently located, from a plurality of regions, wherein the current source information includes regional source information defining different sources applicable to different ones of the plurality of regions, and/or the switching time information includes regional switching time information defining different switching times applicable to different ones of the plurality of regions, wherein the controller can be arranged to determine which source and switching time are currently applicable for said one of the plurality of data streams, based on the identified region, the regional source information and/or the regional switching information.

The controller can be arranged to extract update timing information from the service location information, wherein the update timing information can define an update time, and the controller can be arranged to obtain updated service location information based on the update time, or wherein the update timing information can define time intervals, and the controller can be arranged to check for updated service location information at the defined time intervals.

The controller can be arranged to obtain the updated service location information by randomly selecting a time within a predefined range around the update time, and obtaining the updated service location information at the randomly selected time.

The controller can be arranged to check for updated service location information at predetermined time intervals.

The service location information can further include service location update information identifying a location from which updated service location information can be obtained, the updated service location including the next source information, and the controller can be arranged to obtain the next source information by obtaining the updated service location information from the location identified by the service location update information.

Alternatively, the service location information can include the next source information, so that the controller obtains the next source information from the service location information.

The switching time identified by the switching time information may be a first switching time, and the digital broadcasting receiver can further comprise: a memory for buffering the data stream, wherein the controller can be arranged to control the broadcast content receiving module to simultaneously receive a first version of the data stream from the current source and a second version of the data stream from the next source after the first switching time, control the memory to buffer the second data stream, and to switch from outputting content from the first data stream to outputting content from the buffered second data stream at a second switching time.

The switching time information can include first switching time information identifying the first switching time and second switching time information identifying a local time in the first data stream, and the controller can be arranged to determine that the second switching time has been reached when received time stamp information in the first data stream matches the local time identified by the second switching time information.

The alternate location can be the Internet and the current source information or next source information can comprise a uniform resource locator URL linking to a server from which the data stream can be obtained, or the multiplexed broadcast stream can be a first broadcast stream, the alternate location can be a second broadcast stream, and the current source information or next source information can identify a frequency in the second broadcast stream from which the data stream can be obtained, or the alternate location can be a storage unit for storing recorded broadcast content and the current source information or next source information can identify a location of the recorded data stream in the storage unit.

The first broadcasting signal can be a terrestrial broadcasting signal and the second broadcasting signal can be a satellite broadcasting signal, or vice versa.

The controller can be arranged to extract, from the service location information, a data stream identifier identifying the data stream, and the controller can be further arranged to control the broadcast content receiving module to receive the data stream from the alternate location using the data stream identifier.

The broadcast content can comprise a plurality of data streams and the service location information can identify the same switching time for each of the plurality of data streams.

Alternatively, the broadcast content can comprise a plurality of data streams and the service location information can identify different switching times for different ones of the data streams.

The controller can be arranged to obtain the service location information from a service location server over the Internet, or to obtain the service location information from the broadcast stream.

The controller can be arranged to identify an address of the service location server from metadata received through the broadcast stream.

If the receiver is a Digital Video Broadcasting DVB receiver, the broadcast content on each channel can be a DVB service, and the data stream can be a DVB component.

According to the present invention, there is also provided apparatus for providing service location information relating to broadcast content corresponding to a broadcast channel, the broadcast content being provided through a broadcast stream and comprising a data stream, the apparatus comprising: a service location information generator arranged to obtain current source information identifying one of the broadcast stream and an alternate location as a current source from which the data stream can be obtained, and switching time information identifying a time at which the source of the data stream will be switched, and arranged to generate service location information including the obtained current source information and switching time information; and a communication module arranged to provide the service location information to a digital broadcasting receiver.

The service location information generator can be arranged to obtain regional source information defining different sources applicable to different ones of the plurality of regions, and/or to obtain regional switching time information defining different switching times applicable to different ones of the plurality of regions, and to include the obtained regional source information and/or regional switching time information in the service location information.

The service location information generator can be further arranged to obtain update timing information and include the obtained update timing information in the service location information, wherein the update timing information can define an update time at which the digital broadcasting receiver should obtain updated service location information, or wherein the update timing information can define time intervals at which the digital broadcasting receiver should check for updated service location information.

The update timing information can define the time at which the digital broadcasting receiver should obtain updated service location information, and the service location information generator can be arranged to define different update times for different digital broadcasting receivers.

The service location information generator can be further arranged to obtain service location update information for identifying a location from which updated service location information can be obtained, and include the obtained service location update information in the service location information.

The apparatus can be arranged to provide the service location information to a plurality of digital broadcasting receivers, the alternate location can be the Internet, and the apparatus can further comprise: a delay information obtaining module arranged to obtain, from one or more selected digital broadcasting receivers amongst the plurality of digital broadcasting receivers, information about an internet protocol IP delay experienced by each of the selected digital broadcasting receivers when obtaining said one of the plurality of data streams over the Internet; and a delay information forwarding module arranged to send the obtained delay information to a broadcast provider. This allows the broadcast provider to delay the broadcast stream in accordance with the IP delay.

The delay information obtaining module can be arranged to determine an average IP delay experienced by the selected digital broadcasting receivers, based on the IP delay information received from each of the selected digital broadcasting receivers, and the delay information forwarding module can be arranged to send the determined average IP delay to the broadcast provider as the obtained delay information.

The broadcast content can comprise a plurality of data streams and the service location information can identify the same switching time for each of the plurality of data streams. Alternatively, the switching time information can define different switching times for different ones of the data streams. The current and/or next source information can identify a single alternate location for all the data streams, or can identify different alternate locations for different ones of the data streams.

According to the present invention, there is also provided a method of controlling a digital broadcasting receiver arranged to receive broadcast content from a multiplexed broadcast stream and an alternate location, wherein the broadcast content corresponds to a broadcast channel and comprises a data stream, the method comprising: obtaining service location information including current source information and switching time information, the current source information identifying one of the broadcast stream and the alternate location as a current source from which the data stream can be obtained, and the switching time information identifying a time at which the source of the data stream will be switched; receiving the data stream from the current source before the identified time; obtaining next source information identifying the other one of the broadcast stream and the alternate location as the next source from which the data stream can be obtained; and receiving the data stream from the next source after the identified time.

The current source information can include regional source information defining different sources applicable to different ones of the plurality of regions, and/or the switching time information can include regional switching time information defining different switching times applicable to different ones of the plurality of regions, and the method can further comprise: identifying a region in which the receiver is currently located, from a plurality of regions; and determining which source and switching time are currently applicable for said one of the plurality of data streams, based on the identified region, the regional source information and/or the regional switching information.

The method can further comprise: extracting update timing information from the service location information, wherein the update timing information defines an update time, and the method further comprises obtaining updated service location information based on the update time, or wherein the update timing information defines time intervals, and the method further comprises checking for updated service location information at the defined time intervals.

The update timing information can define an update time, and obtaining updated service location information based on the update time can comprise: randomly selecting a time within a predefined range around the update time; and obtaining the updated service location information at the randomly selected time.

The method can further comprise: checking for updated service location information at predetermined time intervals.

The switching time identified by the switching time information may be a first switching time and the method can further comprise: simultaneously receiving a first version of the data stream from the current source and a second version of the data stream from the next source, after the first switching time; buffering the first data stream; and switching from outputting content from the first data stream to outputting content from the buffered second data stream at a second switching time.

The switching time information can include first switching time information identifying the first switching time and second switching time information identifying a local time in the first data stream, and the method can further comprise: determining that the second switching time has been reached when received time stamp information in the first data stream matches the local time identified by the second switching time information.

The service location information can further include service location update information identifying a location from which updated service location information can be obtained, the updated service location including the next source information, and obtaining the next source information can comprise: obtaining the updated service location information from the location identified by the service location update information.

The alternate location can be the Internet and the current source information or next source information can comprise a uniform resource locator URL linking to a server from which the data stream can be obtained, or the multiplexed broadcast stream can be a first broadcast stream, the alternate location can be a second broadcast stream, and the current source information or next source information can identify a frequency in the second broadcast stream from which the data stream can be obtained, or the alternate location can be a storage unit for storing recorded broadcast content and the current source information or next source information can identify a location of the recorded data stream in the storage unit.

The method can further comprise: extracting, from the service location information, a data stream identifier identifying the data stream, wherein receiving the data stream from the current source or the next source comprises receiving the data stream from the alternate location using the data stream identifier.

The broadcast content can comprise a plurality of data streams and the service location information can identify the same switching time for each of the plurality of data streams.

The service location information can be obtained from a service location server over the Internet, or can be obtained from the broadcast stream.

The method can further comprise: identifying an address of the service location server from metadata received through the broadcast stream.

The receiver can be a Digital Video Broadcasting DVB receiver, the broadcast content on each channel can be a DVB service, and the data stream can be a DVB component.

According to the present invention, there is also provided a method of controlling apparatus for providing service location information relating to broadcast content corresponding to a broadcast channel, the broadcast content being provided through a broadcast stream and comprising a data stream, the method comprising: obtaining current source information identifying one of the broadcast stream and an alternate location as a current source from which the data stream can be obtained; obtaining switching time information identifying a time at which the source of the data stream will be switched; generating service location information including the obtained current source information and switching time information; and providing the service location information to a digital broadcasting receiver.

Obtaining current source information can comprise obtaining regional source information defining different sources applicable to different ones of the plurality of regions, and/or obtaining switching time information can comprise obtaining regional switching time information defining different switching times applicable to different ones of the plurality of regions.

The method can further comprise: obtaining update timing information and including the obtained update timing information in the service location information, wherein the update timing information defines an update time at which the digital broadcasting receiver should obtain updated service location information, or wherein the update timing information defines time intervals at which the digital broadcasting receiver should check for updated service location information.

The update timing information can define the time at which the digital broadcasting receiver should obtain updated service location information, and obtaining update timing information can comprise: defining different update times for different digital broadcasting receivers.

The method can further comprise: obtaining service location update information for identifying a location from which updated service location information can be obtained, and including the service location update information in the service location information.

Providing the service location information can comprise providing the service location information to a plurality of digital broadcasting receivers, the alternate location can be the Internet, and the method can further comprise: obtaining, from one or more selected digital broadcasting receivers amongst the plurality of digital broadcasting receivers, information about an internet protocol IP delay experienced by each of the selected digital broadcasting receivers when obtaining said one of the plurality of data streams over the Internet; and sending the obtained delay information to a broadcast provider.

The method can further comprise: determining an average IP delay experienced by the selected digital broadcasting receivers, based on the IP delay information received from each of the selected digital broadcasting receivers, wherein sending the obtained delay information comprises sending the determined average IP delay to the broadcast provider.

The broadcast content can comprise a plurality of data streams and obtaining switching time information can comprise: generating the service location information to identify the same switching time for each of the plurality of data streams.

BRIEF DESCRIPTION OF DRAWINGS

Embodiments of the present invention will now be described, by way of example only, with reference to the accompanying drawings, in which.

MODE FOR THE INVENTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
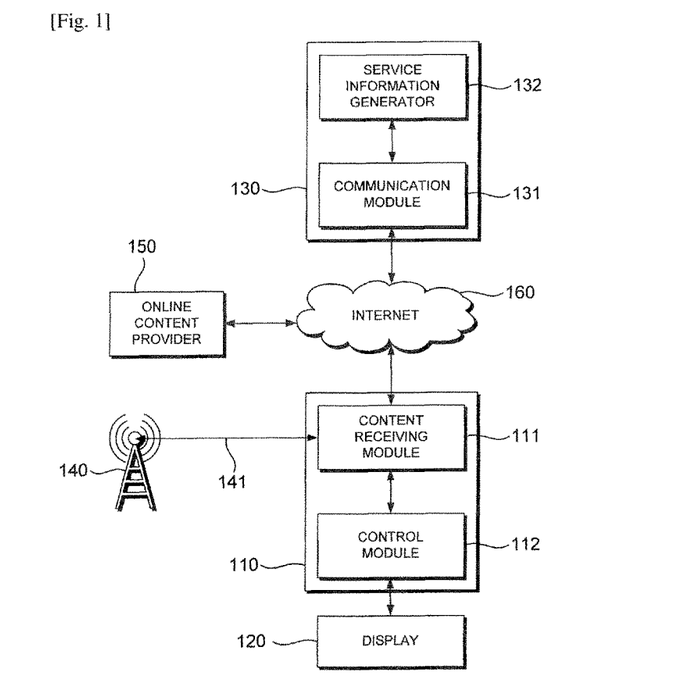
FIG. 1 illustrates a system for distributing broadcast content, according to an embodiment of the present invention.

FIG. 1 illustrates a system for distributing broadcast content, according to an embodiment of the present invention. The system includes a digital broadcasting receiver 110, a display 120, a service information provider 130, a broadcast provider 140, and an online content provider 150. The receiver 110 is arranged to receive broadcast content and output the broadcast content to the display 120.

The broadcast content includes one or more data streams. In the present embodiment, the receiver 110 is a Digital Video Broadcasting (DVB) receiver, the broadcast content is a DVB service, and the one or more data streams are DVB components that make up the DVB service. Hereinafter, the broadcast content will be referred to as a service, and the data streams will be referred to as components. However, the invention is not limited to the DVB standard. In other embodiments the broadcast content and data streams may be received according to a different standard. It will be understood that the different standard may use terminology other than "service" and "component" to identify equivalent elements to the DVB services and components, and in general the invention can be applicable to any receiver which receives broadcast content comprising one or more data streams.

A DVB service comprises broadcast content for a particular channel, for example BBC1, ITV1, Channel 4, and so on. In other broadcasting standards, services may, for example, be referred to as channels. For any given service, the broadcast content can be received as one or more separate data streams that can be combined by a receiver to obtain audio-visual content to be displayed and/or recorded. In a DVB system, the data streams are referred to as components. Examples of components for a particular service can include an audio component containing the audio content, a video component containing the video content, a subtitle component containing subtitles to be overlain on the video content, and an application component containing program code for an application to be executed by the receiver, for example a news application that overlays a ticker tape of breaking news over the video.

As shown in FIG. 1, the receiver 110 comprises a broadcast content receiving module 111 and a control module 112. The control module 112 can, for example, be a general-purpose processor arranged to execute software instructions stored in a computer-readable storage medium, or could be dedicated hardware arranged to perform the necessary functions. The control module 112 can control the broadcast content receiving module 111 to receive the components of a DVB service from different locations. In the present embodiment the broadcast content receiving module 111 includes a tuning module for receiving broadcast content from the broadcast provider 140 through a terrestrial broadcast stream 141, and also includes a network interface such as a Wireless Local Area Network (WLAN) interface for accessing the Internet 160 through a network connection. In addition to receiving broadcast content through the broadcast stream 141, the broadcast content receiving module 111 can use the network interface to receive broadcast content from an online content provider 150.

To identify a current location from which one of the components can be obtained, the control module 112 obtains service location information. For example, the receiver 110 can be arranged to obtain the service location information for a service in response to the service being selected. The service location information for the selected service enables the receiver 110 to determine how to obtain each component in the selected service. The receiver 110 can also be arranged to periodically check for service location information for all services, to build up a local record of service location information and to keep the record up to date.

In the present embodiment, the control module 112 is arranged to obtain service location information from a service location information server (SLIS) 130 over the Internet 160, although in another embodiment the service location information could be included as metadata in the broadcast stream instead of being provided over the Internet. The location of the SLIS 130 can be pre-programmed into the receiver 110, or can be defined by metadata received through the broadcast stream 141. For example, in a DVB system the location of the SLIS 130 can be carried in the broadcast Service Description Table (SDT) or in the Network Information Table (NIT). As a further alternative, the receiver could be arranged to discover the location of the SLIS using Dynamic Host Configuration Protocol (DHCP) or the Domain Name System (DNS).

The service location information includes current source information and switching time information. The current source information identifies one of the broadcast stream and the alternate location as a current source from which a component can be obtained. The switching time information identifies a time at which the source of the component will be switched. If the service comprises a plurality of components, the service location information can include a list of all the service components including a component identifier (ID) for each component, and can include current source information and switching time information for each component ID.

The receiver 110 uses the service location information to determine, at a given time, the location of the source from which each component of a service can be obtained. Before the time identified by the switching time information, the controller 112 controls the content receiving module 111 to receive each component from the current source identified by the current source information for that component.

Before the switching time for a component, the controller 112 should also obtain next source information identifying the next source from which the component can be obtained. The next source will be the other one of the broadcast stream and the alternate location to the current source. In the present embodiment, the controller 112 obtains the next source information by obtaining updated service location information, which includes the next source information. The service location information can include a link to the updated source location information, and can also include update timing information defining a known time at which the updated source location information will be available. However, in another embodiment the next source information is included in the original service location information. This latter approach will require the next source to be known in advance by the SLIS 130.

After obtaining the next source information, the controller 112 is able to identify the next source from which the component can be obtained. Then, after the switching time has passed, the controller 112 controls the broadcast content receiving module 111 to receive the component from the next source.

In this way, at the switching time for a component the receiver 110 switches from receiving the component from the current source to receiving the component from the next source. Embodiments of the present invention therefore allow a content provider to switch a particular service or part of a service from a broadcast stream to another location, or vice versa. By providing the service location information, the content provider can ensure that the receiver is able to seamlessly switch from one location to the other at the time when the source of the component/service is switched, without disrupting a user's viewing experience. When a component, or an entire service, is provided through an alternate source to the broadcast stream, the spectrum previously occupied by that component or service in the broadcast stream is thereby made available for another user. For example, it could be envisaged that all of the services in the multiplex are broadcast during specific hours of the day, and nothing is broadcast during the rest of the time.

Embodiments of the present invention therefore allow spectrum to be shared between users. For example, a mobile telecommunications network may be particularly busy at certain times of the day, and may benefit from additional bandwidth at these times in order to increase the capacity of the network. At the busiest periods, embodiments of the present invention can allow certain broadcast components or services to be switched to alternate sources, for example the Internet, in order to temporarily free up bandwidth for use by the mobile telecoms network. The broadcast components or services can be switched back into the broadcast stream once the load on the mobile telecoms network has decreased.

In the above-described embodiment, the service location information is provided over the Internet. However, the invention is not limited to this approach. In another embodiment, service location information can be provided through the broadcast stream as metadata.

Figure 2:
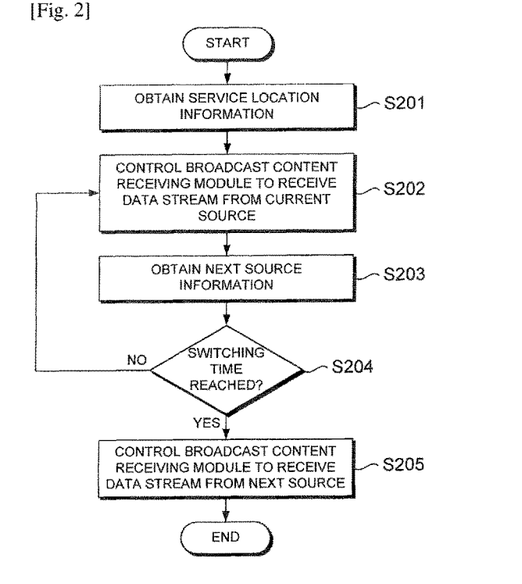
FIG. 2 illustrates a method of controlling a digital broadcasting receiver, according to an embodiment of the present invention.

FIG. 2 illustrates a method of controlling a digital broadcasting receiver, according to an embodiment of the present invention. The method can be executed by the controllers 112, 612 of the receivers 110, 610 of FIG. 1 or 6, and can, for example, be performed by a computer program executed on a processor.

First, in step S201 service location information is obtained for a service, which includes at least one component. The current source information identifies a current source from which the component can be obtained. For example, the current source can be a broadcast stream or an alternate location, such as the Internet, a satellite broadcast stream, or a source of recorded broadcast content.

The current source information can take various forms depending on the source that is identified. For example, the current source information can identify an alternate location, such as the Internet, another broadcast stream, or a source of recorded broadcast content, as the current location. To identify the Internet as the current source, the current source information can comprise a uniform resource locator URL linking to an IP location from which the component can be obtained, for example using Dynamic Adaptive Streaming over HTTP (DASH) or Real-time Transport Protocol (RTP). To identify another broadcast stream as the current source, the current source information can identify a frequency in a second broadcast stream from which the component can be obtained, for example a satellite broadcast stream. Alternatively, the current source could be identified in a broadcast stream using metadata such as a DVB ONID/TSID (Original Network Identifier/Transport Stream Identifier) pair present in the NIT, and a service ID or Packet ID (PID). To identify a storage unit as the current source, the current source information can identify a location of the recorded component in the storage unit.

Next, in step S202 a broadcast content receiving module is controlled to receive the data stream, which in the present embodiment is a DVB component, from the identified current source. Then, in step S203 next source information is obtained for the component. In the present embodiment this is achieved by obtaining updated service location information which includes the next source information, but in other embodiments the next source information could be included in the service location information obtained in step S201.

The step of obtaining next source information, i.e. step S203, is preferably performed at any stage before the switching time for the component occurs. However, in some embodiments the receiver could wait until the switching time before obtaining the next source information. If the next source information can be obtained quickly, this may not result in any noticeable delay when switching from the current source to the next source.

Next, in step S204 it is periodically checked whether the switching time indicated in the service location information has been reached. When the switching time is reached, then in step S205 the broadcast content receiving module is controlled to receive the component from the next source.

Figure 3:
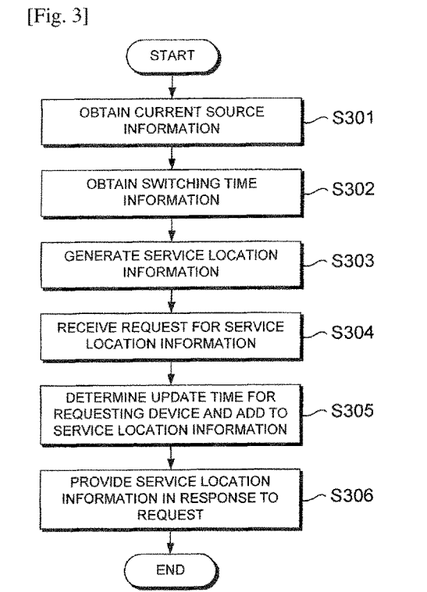
FIG. 3 illustrates a method of controlling an apparatus for providing service location information, according to an embodiment of the present invention.

FIG. 3 illustrates a method of controlling an apparatus for providing service location information, according to an embodiment of the present invention. The method can be executed by the service location provider 130 shown in FIG. 1, and can, for example, be performed by a computer program executed on a processor.

First, in step S301 current source information is obtained, and in step S302 switching time information is obtained. The current source information and switching time information can be obtained in any order, that is, the switching time information can be obtained before, or at the same time as, the current source information. To obtain the current source information and switching time information, various approaches are possible. For example, a database of forthcoming component switches can be maintained for each service. To generate the service location information for a particular service, the apparatus can query the database to retrieve current source information and switching time information for each component in that service. Alternatively, the current source information and switching time information could be received through user input.

Next, in step S303 service location information including the obtained current source information and switching time information is generated. In step S304 a request for the service location information is received. For example, when the method is performed by the SLIS 130 of FIG. 1, the request can be received from a receiver over the Internet, and the service location information can be sent to the receiver over the Internet.

Then, in step S305 an update time is determined for the requesting device. In the present embodiment, one of a plurality of different update times is selected. Different update times can be selected for different receivers, to avoid all receivers requesting updated service location information at the same time. In this embodiment, it is not necessary to assign a unique time to every receiver. For example, the apparatus can store a record of how many receivers have been allocated each of the update times, so that the update times are allocated evenly. For instance, if five different update times are available, e.g. 8:00 pm, 8:01 pm, 8:02 pm, 8:03 pm, and 8:04 pm, each time can be selected one-fifth of the time in response to a request. The first time could be selected in response to the 1st, 6th, 11th . . . requests, the second time could be selected in response to the 2nd, 7th, 12th . . . requests, and so on. Such methods can avoid the apparatus being swamped by a large number of requests for updated service location information at the same time.

Although in the present embodiment update timing information is included in the service location information, the invention is not limited to this approach. In other embodiments receivers can be pre-programmed with update times and/or update intervals. In such embodiments it is not necessary to define update times through the service location information, and step S305 can be omitted.

Finally, in step S306 the service location information is provided to the requesting device. In the present embodiment the apparatus sends the service location information to the receiver over the Internet, but in another embodiment the apparatus could broadcast the service location information to all receivers through the broadcast stream, for example in the SDT or NIT, in which case step S304 can be omitted.

The method of FIG. 3 can be used to generate service location information on request, or can be used to generate service location information in advance. When the service location information is generated in advance, the generated service location information can be stored after step S303, and retrieved when it is needed for steps S305 and S306.

Figure 4:
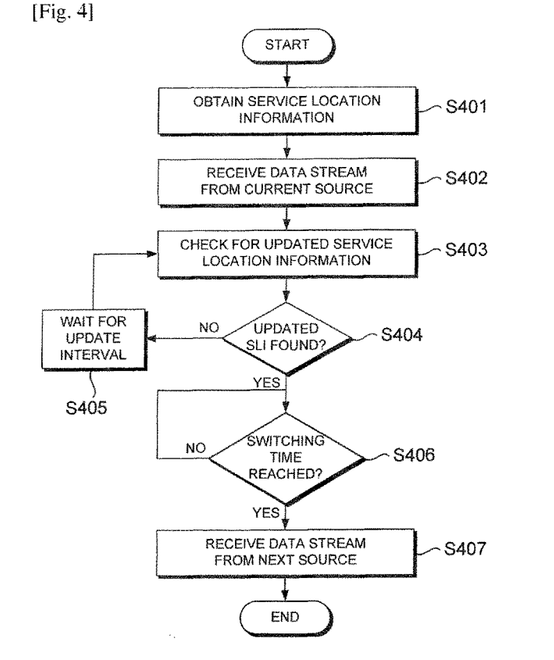
FIG. 4 illustrates a method of obtaining updated service location information, according to an embodiment of the present invention.

FIG. 4 illustrates a method of obtaining updated service location information, according to an embodiment of the present invention. The method can be executed by the controllers 112, 612 of the receivers 110, 610 of FIG. 1 or 6, and can, for example, be performed by a computer program executed on a processor.

Steps S401, S402, S406 and S407 correspond respectively to steps S201, S202, S204 and S205 of the method shown in FIG. 2. A detailed description of these steps will not be repeated here, to maintain brevity.

In the present embodiment, steps S403, S404 and S405 are performed in order to obtain updated service location information including the next source information. Steps S403, S404 and S405 represent one possible method of obtaining the next source information in step S203 of FIG. 2. Specifically, in step S403 the receiver checks for updated service information from a predetermined source, for example a service location information server as shown in FIG. 1, or in metadata received through the broadcast stream. Then, in step S404 it is checked whether updated service information was found. If not, the receiver proceeds to wait for an update time interval at step S405, before returning to step S403 and checking again for updated service location information.

In the present embodiment the update time interval is defined by update timing information included in the service location information obtained in step S401. For example, the update timing information may indicate that the receiver should check for updated service location at 15 minute intervals. However, in another embodiment the update time interval can be pre-programmed into the receiver, instead of being defined by the service location information. Also, in some embodiments the update time is indicated using a suitable HyperText Transfer Protocol (HTTP) header field, for example the "Expires" field. In such embodiments, the service location information is carried in the HTTP payload and the update timing information is carried by the relevant field in the HTTP header.

Once updated service location information has been obtained, then the receiver proceeds to periodically check whether the switching time has been reached in step S406. When the switching time is reached, the receiver begins receiving the component from the next source identified by the next source information obtained in step S403.

Figure 5:
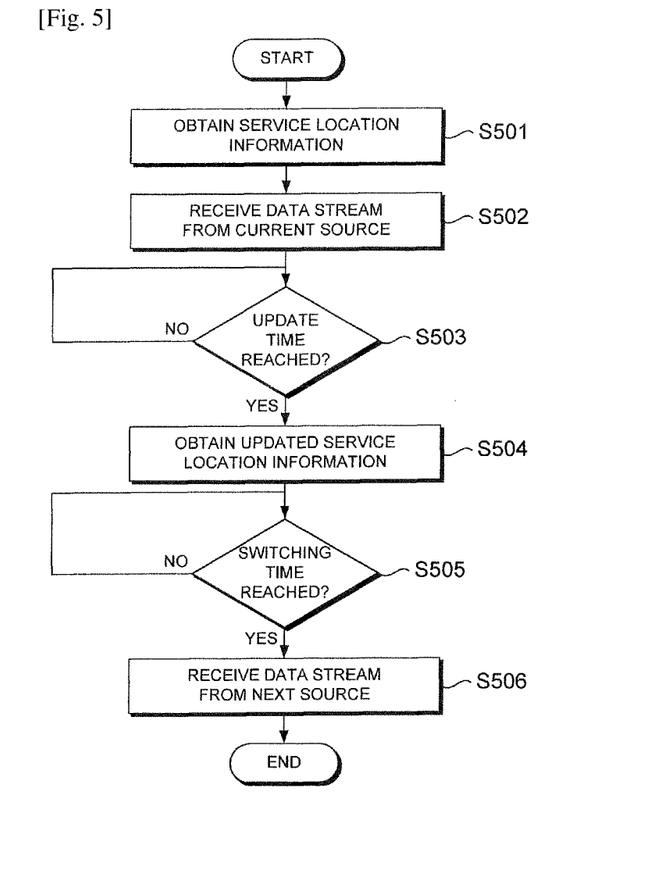
FIG. 5 illustrates a method of obtaining updated service location information, according to an embodiment of the present invention.

FIG. 5 illustrates a method of obtaining updated service location information, according to an embodiment of the present invention. The method can be executed by the controllers 112, 612 of the receivers 110, 610 of FIG. 1 or 6, and can, for example, be performed by a computer program executed on a processor.

As in FIG. 4, steps S501, S502, S505 and S506 of FIG. 5 correspond respectively to steps S201, S202, S204 and S205 of the method shown in FIG. 2, and a detailed description of these steps will not be repeated here. Steps S503 and S504 represent another possible method of obtaining the next source information in step S203 of FIG. 2.

Specifically, in step S503 the receiver periodically checks whether an update time has been reached. In the present embodiment the update time is a specific time defined by update timing information included in the service location information obtained at step S501, for example 8:00 pm. Once the update time has been reached, then in step S504 the receiver proceeds to obtain updated service location information including the next source information. For example, the receiver may request the updated service location information from the SLIS 130 of FIG. 1.

In some embodiments, the receiver is arranged to randomly select the update time within a predefined range around the time defined by the update timing information, and obtain the updated service location information at the randomly selected time. Including this randomisation step has the advantage that requests from a large number of receivers can be spread out across the predefined range, to avoid a situation where the service location information server receives a large number of requests at the same time.

In the methods of FIGS. 4 and 5, a receiver determines when to look for updated service location information on the basis of update timing information included in the original service location information. However, the invention is not limited to these methods, and other approaches are possible. For example, a receiver can be pre-programmed to check for updated service location information at a predetermined time each day, e.g. 2 am, and/or to check for updated service location information at predetermined time intervals, e.g. every 15 minutes.

Figure 6:
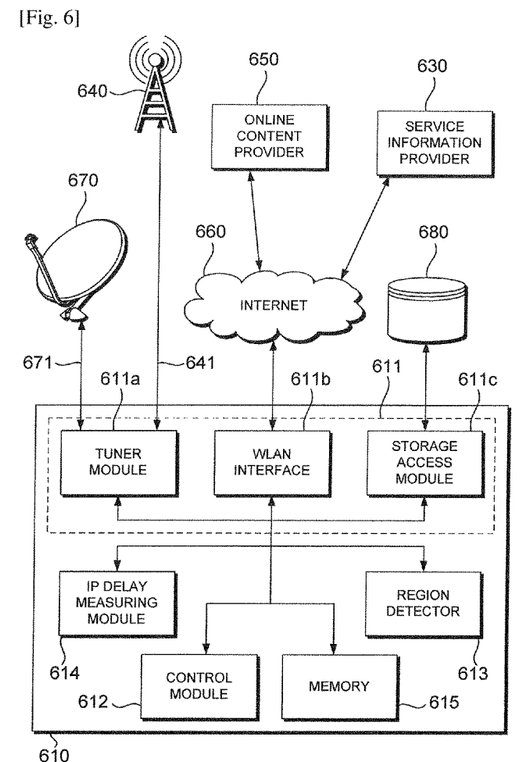
FIG. 6 illustrates a system for distributing broadcast content, according to an embodiment of the present invention.

FIG. 6 illustrates a system for distributing broadcast content, according to an embodiment of the present invention. Like the system of FIG. 1, the system of the present embodiment includes a digital broadcasting receiver 610, a service information provider 630, a terrestrial broadcaster 640, and an online content provider 650. In the present embodiment the service information provider 630 is a service location information server (SLIS) 630 accessible via the Internet 660. The receiver 610 may output broadcast content to a display (not shown in FIG. 6). To avoid unnecessary repetition, only those elements of the present system which differ from the system of FIG. 1 will be described in detail here.

As shown in FIG. 6, the receiver 610 includes a content receiving module 611, control module 612, region detector 613, an IP delay measuring module 614, and a memory 615. The content receiving module 611 comprises a tuner module 611a, WLAN interface 611b, and a storage access module 611c.

The tuner module 611a can be controlled to receive broadcast content through a terrestrial broadcast stream 641 received from the terrestrial broadcaster 640, and/or to receive broadcast content through a satellite broadcast stream 671 received through a satellite dish 670. The WLAN interface 611b can be controlled to connect to the Internet 660 to receive broadcast content from the online content provider 650. In the present embodiment the WLAN interface 611b can also be controlled to receive the service location information from the SLIS 630, but in other embodiments a separate network interface could be used to receive the service location information. The storage access module 611c can be controlled to access recorded broadcast content from a storage unit 680, which could for example be a local hard disk drive (HDD) included in the receiver 610, or a networked HDD. Other types of storage could be used in other embodiments, for example Flash memory or optical data storage.

The region detector 613 is arranged to detect a geographical region in which the receiver 610 is currently located, out of a plurality of possible regions. The control module 612 can use the detected region to determine which regional source information and/or regional switching time information is currently applicable. The use of regional information will be described later with reference to FIG. 9.

The IP delay measuring module 614 is arranged to measure an IP delay experienced by the receiver when communicating with the online content provider 650. A broadcaster can use the IP delay information to delay broadcast content in the broadcast stream in accordance with the IP delay, so that content received through the broadcast stream and over IP is synchronised. This allows the receiver to seamlessly switch between the broadcast stream and IP at the switching time. The use of IP delay information will be described in more detail with reference to FIG. 7.

Figure 7:
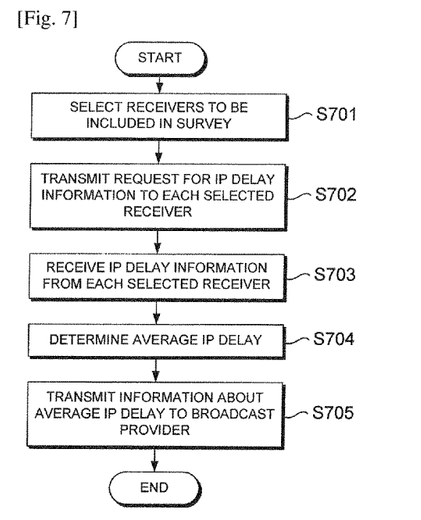
FIG. 7 illustrates a method of obtaining information about an IP delay, according to an embodiment of the present invention.

FIG. 7 illustrates a method of obtaining information about an IP delay, according to an embodiment of the present invention. The method can be executed by a service location information server (SLIS) such as the one shown in FIG. 1, or can be executed by any suitable apparatus. That is, the process of gathering and reporting information about IP delays does not have to be performed by the same apparatus that is responsible for providing service location information. The method of FIG. 7 can, for example, be performed by a computer program executed on a processor.

First, in step S701 one or more receivers are selected from a plurality of receivers such as the ones shown in FIGS. 1 and 6. Any number of receivers can be selected to be included in an IP delay survey, out of the total number of receivers in the system.

Next, in step S702 a request for IP delay information is transmitted to each of the selected receivers. Any receivers which include an IP delay measuring module, such as the receiver 610 of FIG. 6, can respond to the request by measuring the IP delay experienced by the receiver and reporting back to the apparatus, for example the SLIS.

In step S703, IP delay information is received from each selected receiver. However, it could be envisaged that in some systems, a selected receiver may not be able to measure an IP delay. For example, the selected receiver may not have the capability to measure an IP delay at all, or may be prevented from measuring an IP delay by other factors, for example the receiver's Internet connection may be temporarily disabled when the apparatus conducts the survey of receivers. Therefore in step S703 it is possible that responses may not be received from every one of the selected receivers.

Next, in step S704 an average IP delay is determined based on the received IP delay information from the selected receivers, for example a mean IP delay for all selected receivers may be calculated. Then, in step S705 the obtained information about the IP delay, which in this embodiment is the average IP delay, is transmitted to a broadcast provider.

The broadcast provider may then use the information about the IP delay to apply a similar delay to the broadcast content transmitted through the broadcast stream, relative to the broadcast content being provided over IP, when the broadcast content is switched from IP to the broadcast stream. This ensures that when a receiver switches to the broadcast stream to receive the broadcast content, the content now being received is synchronised with the content that was previously being received over IP, facilitating a seamless transition between IP and RF sources.

Embodiments of the present invention can use a method such as the one shown in FIG. 7 to synchronise broadcast content when switching the content source from IP to RF (i.e. a broadcast stream). However, in some embodiments this capability could be omitted.

Figure 8:
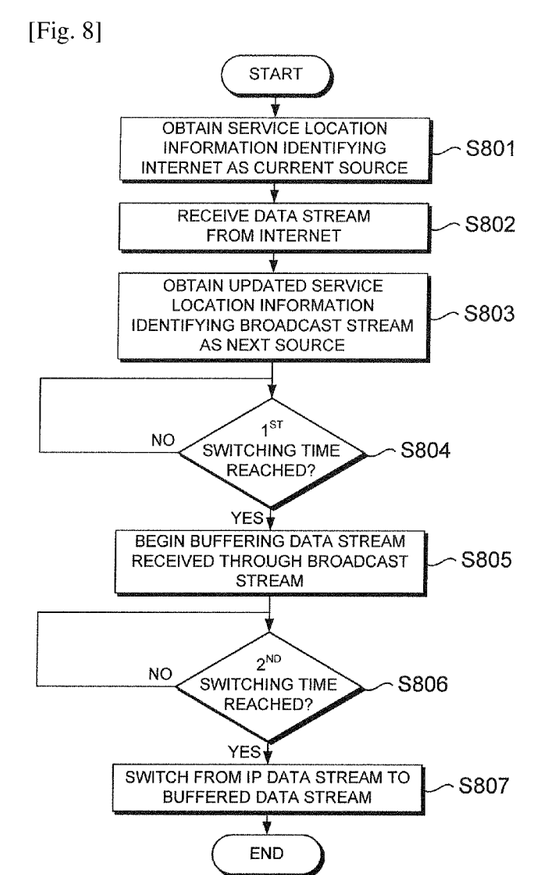
FIG. 8 illustrates a method of controlling a receiver to switch from receiving broadcast content through the Internet to receiving the broadcast content through a broadcast stream, according to an embodiment of the present invention.

FIG. 8 illustrates a method of controlling a receiver to switch from receiving broadcast content through the Internet to receiving the broadcast content through a broadcast stream, according to an embodiment of the present invention. The method can be executed by the controllers 112, 612 of the receivers 110, 610 of FIG. 1 or 6, and can, for example, be performed by a computer program executed on a processor.

The method of FIG. 8 provides another approach to compensating for an IP delay when the source of broadcast content is switched from IP to the broadcast stream. The method of FIG. 8 is performed at the receiver, and can be employed instead of, or as well as, the method of FIG. 7.

First, in step S801 service location information identifying the Internet as the current source is obtained, and accordingly a data stream is obtained over IP in step S802. Then, in step S803, updated service location information is obtained indicating that the next source for the data stream will be the broadcast stream.

In step S804, the receiver waits until a switching time identified by the service location information is reached. Specifically, in the present embodiment the service location information defines a first switching time and a second switching time, and in step S804 the first switching time is used. The first switching time indicates a time at which an RF version of the data stream will be available through the broadcast stream, at which point the receiver should begin receiving and buffering the RF version of the data stream from the broadcast stream.

Specifically, at the first switching time, in step S805 the receiver begins receiving the data stream through the broadcast stream and buffers the received content in a memory, such as the memory 615 shown in FIG. 6. However, the receiver also continues to receive the data stream over IP and reproduces the IP version of the data stream, as opposed to the RF version being received through the broadcast stream.

In the present embodiment, the IP version of the data stream includes a local time in the form of time stamp information, which defines a local time within the IP data stream. The local time can be defined in relation to the broadcast content being provided in the data stream, which may be a particular programme identified by a Programme Identifier (PID). For example, the local time at the start of the broadcast content can be defined as 00:00:00.00 (hours: minutes:seconds).

The second switching time is defined as a specific local time within the IP data stream. In particular, the local time defined by the second switching time corresponds to the local time in the RF data stream at the switching time. Therefore when the broadcast provider starts to broadcast the RF version of the data stream through the broadcast stream, they should ensure that the local time in the RF version at the first switching time will match the second switching time.

The second switching time indicates the time at which the receiver should switch from reproducing the IP version of the data stream to reproducing the buffered RF version of the data stream. As such, in step S806 the receiver waits until the second switching time, whilst continuing to buffer the RF data stream and reproduce the IP data stream. Therefore between the first and second switching times, the receiver is arranged to receive the data stream from both the IP source and the RF source. Since the second switching time is defined as a local time in the IP data stream, in step S806 the receiver repeatedly checks the current time stamp information in the IP data stream against the second switching time, and determines that the second switching time has been reached once the current time stamp information matches the second switching time.

Then, at the second switching time, in step S807 the receiver stops reproducing the IP data stream and begins reproducing the buffered data stream, starting from the same local time in the buffered data stream as the local time that was stored in step S806. It can be assumed that the content in the buffered RF data stream starts from the same local time defined by the second switching time, since the broadcaster has synchronised the RF data stream to start from the appropriate point when the receiver starts to buffer the RF data stream at the first switching time. This ensures that when switching from IP to RF versions of the data stream, the content displayed to a user is not interrupted despite the IP delay.

In more detail, at any given point in time while the receiver is receiving both the IP and RF versions of the data stream, the local time in the IP version will lag behind the local time in the RF version as a result of the IP delay experienced by the receiver. Therefore, if the receiver switched directly from the IP data stream to the RF data stream without buffering the RF data stream, the content in the RF data stream would be ahead of the content in the IP data stream, and so a portion of the content would be missed by a user when the receiver switched from IP to RF. By buffering the RF data stream before switching sources from IP to RF, embodiments of the present invention can allow a receiver to seamlessly switch from IP to RF sources without interruption, in spite of the IP delay experienced by the receiver.

In the present embodiment, the second switching time is defined as a local time in the IP data stream. However, in another embodiment the second switching time can be defined as a real time after the first switching time, with the first and second switching times being separated by a sufficiently long time interval for the delayed IP data stream to catch up with the start of the buffered RF data stream. In such embodiments, the RF data stream can also include time stamp information defining the local time in the data stream, and when switching to the buffered RF data stream the receiver can begin reproducing the buffered RF data stream from the same local time that had just been reached in the IP data stream, to ensure seamless reproduction of the broadcast content. Preferably the interval between the first and second switching times is chosen to be equal to or greater than a maximum expected IP delay that will be experienced by a receiver. This approach does not require a broadcast provider to accurately match the local time in the RF data stream to the second switching time, at the first switching time.

Alternatively, in another embodiment the service location information may only define a first switching time, and the receiver can be arranged to automatically select the second switching time as being a predetermined time interval after the first switching time.

It will be understood that in embodiments such as the ones described above with reference to FIG. 8, it will be necessary for the online content provider to continue providing the data stream over IP for some time after the switching time. When a second switching time is defined as a local time in the IP data stream, the online content provider should continue providing the data stream over IP until the local time in the IP data stream reaches the second switching time.

In the embodiment of FIG. 8 the first switching time is defined as a particular time of day, for example 6 pm. When a switching time is defined in absolute terms in this way, the receiver can determine that the switching time has been reached when the system clock in the receiver reaches the defined time.

However, in other embodiments the service location information can define the first switching time as being a local time within the RF data stream, in a similar manner to how the second switching time is defined in the method of FIG. 8 with respect to the IP data stream. The receiver can be arranged to monitor time stamps in the received RF data stream, and begin buffering the RF data stream when the local time in the RF data stream reaches the first switching time. In such embodiments, it is necessary for the receiver to know when to begin looking for the RF data stream in the broadcast stream, since the first switching time is defined in relative rather than absolute terms. Since the IP delay will typically be quite short in real terms, for example seconds or minutes rather than hours or days, the receiver can determine when to begin monitoring the broadcast stream based on the local time in the IP data stream. For example, if the first switching time is defined as 00:30:00.00 in the RF data stream, the receiver can be arranged to begin searching for the RF data stream in the broadcast stream at a predetermined time period before the local time in the IP data stream reaches this time. That is, if the predetermined time period is 2 minutes, the receiver would begin searching for the RF data stream in the broadcast stream once the local time in the IP data stream reaches 00:28:00.00. If the RF data stream is not already available, it can be assumed that the receiver will not have long to wait before the broadcaster begins transmitting the RF data stream, since the time offset between the RF and IP streams is relatively small. Once the receiver begins receiving the RF data stream, it monitors the local time in the RF data stream and begins buffering the RF data stream once the local time reaches the switching time of 00:30:00.00.

In general therefore, in embodiments of the present invention a first switching time and a second switching time can each be defined either in relative terms, as a local time within a data stream, or in absolute terms, as a time measured by a system clock.

Furthermore, although certain embodiments have been described above, with reference to FIG. 8, in which a receiver switches from an IP source to an RF source for a data stream, such methods are not limited to this particular use case. Similar methods may be used when switching from any first source to any second source, when broadcast content received from the first source is delayed with respect to the same content received from the second source. As an example, satellite broadcasting signals are delayed with respect to terrestrial broadcasting signals due to the additional distance traveled by the satellite signal. Similar methods could therefore be implemented by a receiver when switching from a satellite broadcasting signal to a terrestrial broadcasting signal to receive particular broadcast content.

Figure 9:
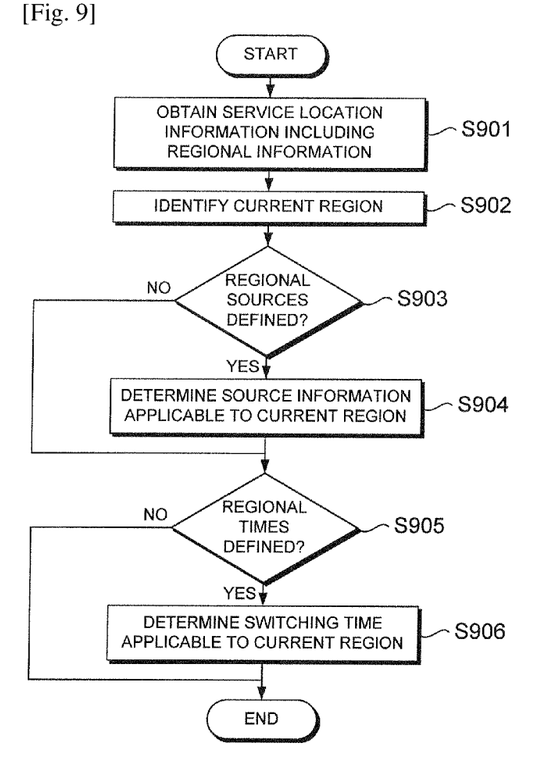
FIG. 9 illustrates a method of controlling a receiver based on regional service location information, according to an embodiment of the present invention.

FIG. 9 illustrates a method of controlling a receiver based on regional service location information, according to an embodiment of the present invention. The method can be executed by the controllers 112, 612 of the receivers 110, 610 of FIG. 1 or 6, and can, for example, be performed by a computer program executed on a processor.

First, in step S901 the receiver obtains service location information including regional information, for example regional current source information and/or regional switching time information. Next, in step S902 the receiver determines the region in which it is currently location. For example, a region detector such as the one shown in FIG. 6 can be arranged to use online tools to identify the region through an Internet connection, for instance using IP address look-up or a postcode entry. Alternatively, the control module can receive a user selection indicating the current region through a user interface. Although in the present embodiment the current region is identified after obtaining the service location information, in general the determination of the current region can be made at any point. For example, the receiver can be arranged to identify the current region on start-up, and/or to periodically check whether the current region has changed during operation of the receiver.

Next, in step S903 it is checked whether the service location information includes regional source information. If regional sources are defined, then in step S904 the receiver determines which of the regional source information is applicable to the region in which the receiver is currently located. This allows the receiver to identify the correct current source.

Next, in step S905 it is checked whether the service location information includes regional switching time information. If regional switching times are defined, then in step S906 the receiver determines which of the regional switching time information is applicable to the region in which the receiver is currently located. This allows the receiver to identify the correct switching time.

Once the correct current source and switching times have been identified for the current region, the receiver can proceed using a method such as the one shown in FIG. 2 to switch between current and next sources at the appropriate time. It will be understood that similar steps to S903 and S904 can be performed when the next source information is obtained.

Embodiments of the invention have been described in which a receiver and display are provided as physically separate devices, for example a set-top box connected to a television. However, the invention is not limited to such arrangements, and in other embodiments the receiver and display could be integrated, for example as a television with built-in receiver. Furthermore, in some embodiments a display may be omitted altogether, for example when the received broadcast content is audio-only content such as digital radio. In yet another embodiment, the receiver may record the received broadcast content in a storage unit such as a local or networked hard-disk drive (HDD), instead of outputting the received content for reproduction through a display and/or speaker.

Embodiments of the invention have been described above in which service location information is used to inform a receiver of a time at which the source of a component in a DVB service will be switched between the broadcast stream and an alternate location. In embodiments where the service includes a plurality of components, various scenarios are possible. For example, only one of the components may be switched to an alternate location whilst the remainder of the components continue to be provided through the broadcast stream. In this scenario, the service location information only needs to include current and/or next source information, and switching time information, for the particular component being switched, which can be identified by a component identifier (ID) included in the service location information. Alternatively, some or all of the components can be switched at different times and/or to different sources, in which case the service location information should include current/next source information, and/or switching time information as appropriate for each component that is being switched. As yet a further alternative, all components can be switched at the same time so that the entire service is switched together from the broadcast stream to the alternate location, or vice versa. In this scenario, the service location information only needs to define a single switching time.

Whilst certain embodiments of the invention have been described herein with reference to the drawings, it will be understood that many variations and modifications will be possible without departing from the scope of the invention as defined in the accompanying claims.

The invention claimed is:

1. A digital broadcasting receiver comprising:
a broadcast content receiving module configured to receive broadcast content from a broadcast stream server and an alternate location; and
a controller configured to:
obtain service location information including current source information and switching time information, wherein the current source information identifying one of the broadcast stream server and the alternate location as a current source from which the broadcast content can be obtained, and the switching time information identifying a time at which the current source of the broadcast content will be switched,
before the identified time, obtain next source information identifying the other one of the broadcast stream server and the alternate location as a next source from which the broadcast content can be obtained, and
control the broadcast content receiving module to receive the broadcast content from the current source before an identified time and to receive the broadcast content from the next source after the identified time,
wherein the broadcast content comprises a plurality of data streams, the service location information further comprise a list of the plurality of data streams including a identifier for each of the plurality of data streams, and the switching time information comprise a switching time corresponding to the identifier for each of the plurality of data streams.

2. The digital broadcasting receiver of claim 1, further comprising:
a region identifying module configured to identify a region in which the digital broadcasting receiver is located, from a plurality of regions,
wherein the current source information includes regional source information defining different sources applicable to different ones of the plurality of regions, and/or the switching time information includes regional switching time information defining different switching times applicable to different ones of the plurality of regions, and
wherein the controller is arranged to determine which source and switching time are currently applicable for the broadcast content, based on the identified region, the regional source information and/or the regional switching information.

3. The digital broadcasting receiver of claim 1, wherein the controller is configured to extract update timing information from the service location information,
wherein the update timing information includes an update time, and the controller is configured to obtain updated service location information based on the update time, or
wherein the update timing information includes time intervals, and the controller is configured to check for updated service location information at the time intervals.

4. The digital broadcasting receiver of claim 3, wherein the controller is configured to obtain the updated service location information by randomly selecting a time within a predefined range around the update time, and obtaining the updated service location information at the randomly selected time.

5. The digital broadcasting receiver of claim 1, wherein the switching time identified by the switching time information is a first switching time, the receiver further comprising:
  a memory for buffering the broadcast content,
  wherein the controller is configured to control the broadcast content receiving module to simultaneously receive a first version of the broadcast content from the current source and a second version of the broadcast content from the next source after the first switching time, control the memory to buffer the second broadcast content, and to switch from outputting content from the first broadcast content to outputting content from the buffered second broadcast content at a second switching time.

6. The digital broadcasting receiver of claim 5, wherein the switching time information includes first switching time information identifying the first switching time and second switching time information identifying a local time in the broadcast content, and
  wherein the controller is configured to determine that the second switching time has been reached when received time stamp information in the broadcast content matches the local time identified by the second switching time information.

7. The digital broadcasting receiver of claim 1, wherein the service location information further includes service location update information identifying a location from which updated service location information can be obtained, the updated service location including the next source information, and
  wherein the controller is configured to obtain the next source information by obtaining the updated service location information from the location identified by the service location update information.

8. The digital broadcasting receiver of claim 1, wherein the alternate location is the Internet and the current source information or next source information comprises a uniform resource locator URL linking to a server from which the broadcast content can be obtained, or
  wherein the current source information or next source information identifies a frequency in the broadcast content from which the broadcast content can be obtained, or
  wherein the alternate location is a storage unit for storing recorded broadcast content and the current source information or next source information identifies a location of the recorded broadcast content in the storage unit.

9. The digital broadcasting receiver of claim 1, wherein the controller is configured to extract, from the service location information, a data stream identifier identifying the broadcast content, and
  wherein the controller is further configured to control the broadcast content receiving module to receive the data stream from the alternate location using the data stream identifier.

10. The digital broadcasting receiver of claim 1, wherein the service location information identifies the same switching time for each of the plurality of data streams.

11. An apparatus for providing service location information relating to broadcast content, the apparatus comprising:
  a service location information generator configured to obtain current source information identifying one of a broadcast stream server and an alternate location as a current source from which the broadcast content can be obtained, and switching time information identifying a time at which the current source of the broadcast content will be switched, and configured to generate service location information including the obtained current source information and switching time information; and
  a communication module configured to provide the service location information to a digital broadcasting receiver,
  wherein the broadcast content comprises a plurality of data streams, the service location information further comprise a list of the plurality of data streams including a identifier for each of the plurality of data streams, and the switching time information comprise a switching time corresponding to the identifier for each of the plurality of data streams.

12. The apparatus of claim 11, wherein the service location information generator is configured to obtain regional source information defining different sources applicable to different ones of a plurality of regions, or to obtain regional switching time information defining different switching times applicable to different ones of the plurality of regions, and to include the obtained regional source information and/or regional switching time information in the service location information.

13. The apparatus of claim 11, wherein the service location information generator is further configured to obtain update timing information and include the obtained update timing information in the service location information,
  wherein the update timing information includes an update time at which the digital broadcasting receiver should obtain updated service location information, or
  wherein the update timing information includes time intervals at which the digital broadcasting receiver should check for updated service location information.

14. The apparatus of claim 13, wherein the update timing information includes the time at which the digital broadcasting receiver should obtain updated service location information, and the service location information generator is configured to determine different update times for different digital broadcasting receivers.

15. The apparatus of claim 11, wherein the service location information generator is further configured to obtain service location update information for identifying a location from which updated service location information can be obtained, and include the obtained service location update information in the service location information.

16. The apparatus of claim 11, wherein the apparatus is configured to provide the service location information to a plurality of digital broadcasting receivers, wherein the alternate location is the Internet, and the apparatus further comprises:
  a delay information obtaining module configured to obtain, from one or more selected digital broadcasting receivers amongst the plurality of digital broadcasting receivers, information about an internet protocol (IP) delay experienced by each of the selected digital broadcasting receivers when obtaining the broadcast content over the Internet; and
  a delay information forwarding module configured to send the obtained delay information to a broadcast provider.

17. The apparatus of claim 16, wherein the delay information obtaining module is configured to determine an average IP delay experienced by the selected digital broadcasting receivers, based on the IP delay information received from each of the selected digital broadcasting receivers, and wherein the delay information forwarding module is configured to send the determined average IP delay to the broadcast provider as the obtained delay information.

18. The apparatus of claim 11, wherein the service location information identifies the same switching time for each of the plurality of data streams.

19. A method of controlling a digital broadcasting receiver arranged to receive broadcast content, the method comprising:

obtaining, by a receiver, service location information including current source information and switching time information, wherein the current source information identifying one of a broadcast stream server and an alternate location as a current source from which the broadcast content can be obtained, and the switching time information identifying a time at which the source of the broadcast content will be switched;

receiving the broadcast content from the current source before the identified time;

before the identified time, obtaining next source information identifying the other one of the broadcast stream server and the alternate location as a next source from which the broadcast content can be obtained; and receiving the broadcast content from the next source after the identified time, wherein the broadcast content comprises a plurality of data streams, the service location information further comprise a list of the plurality of data streams including a identifier for each of the plurality of data streams, and the switching time information comprise a switching time corresponding to the identifier for each of the plurality of data streams.

20. A method of controlling apparatus for providing service location information relating to broadcast content, the method comprising:

obtaining current source information identifying one of a broadcast stream server and an alternate location as a current source from which the broadcast content can be obtained;

obtaining switching time information identifying a time at which the source of the broadcast content will be switched;

generating service location information including the obtained current source information and switching time information; and providing the service location information to a digital broadcasting receiver, wherein the broadcast content comprises a plurality of data streams, the service location information further comprise a list of the plurality of data streams including a identifier for each of the plurality of data streams, and the switching time information comprise a switching time corresponding to the identifier for each of the plurality of data streams.

* * * * *